H. E. STRATTON.
VEHICLE WHEEL.
APPLICATION FILED DEC. 30, 1915.
1,207,340.
Patented Dec. 5, 1916.
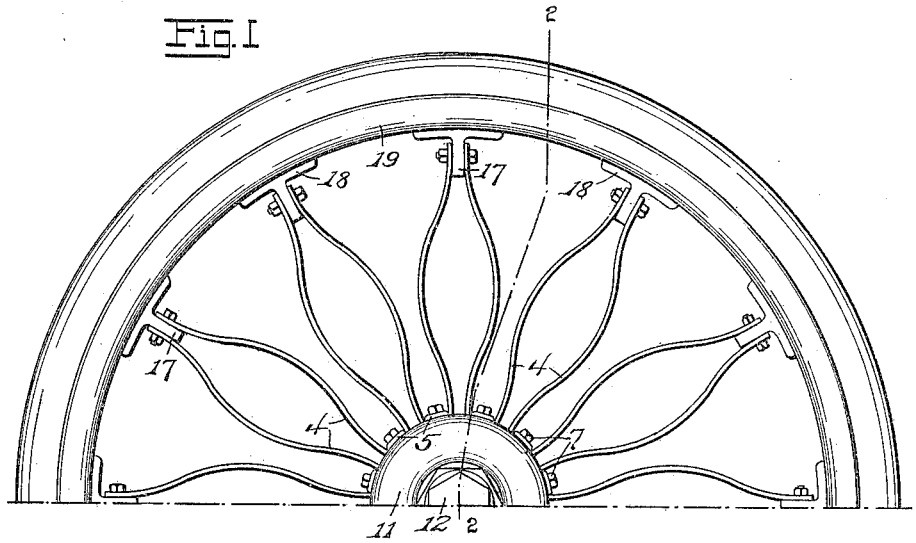
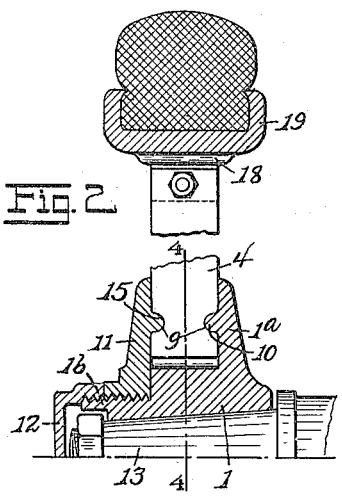
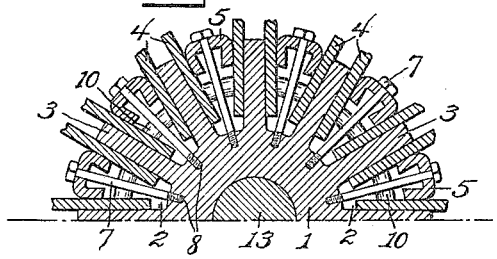
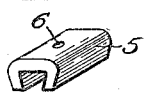
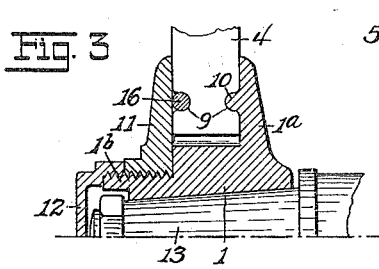
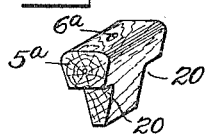
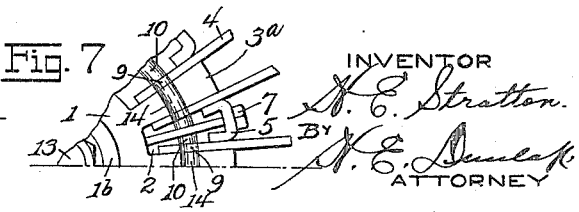

UNITED STATES PATENT OFFICE.

HARPER E. STRATTON, OF EMPIRE, OHIO.

VEHICLE-WHEEL.

1,207,340.

Specification of Letters Patent.

Patented Dec. 5, 1916.

Application filed December 30, 1915. Serial No. 69,305.

*To all whom it may concern:*

Be it known that I, HARPER E. STRATTON, a citizen of the United States of America, and resident of Empire, county of Jefferson, and State of Ohio, have invented certain new and useful Improvements in Vehicle-Wheels, of which the following is a specification.

This invention relates broadly to vehicle wheels, and specifically to a wheel of the resilient spring type.

The primary object of the invention is to provide a wheel having resilient metal spokes which are formed and relatively disposed to effectually absorb shocks incident to road travel to an extent substantially equivalent to that of the usual pneumatic tires.

A further object is to provide a wheel embodying improved means for removably mounting the spokes in the hub.

With these and other objects in view, the invention resides in the features of construction, arrangement of parts and combinations of elements which will hereinafter be fully described, reference being had to the accompanying drawings, in which—

Figure 1 is a side elevation of a part of a symmetrical wheel; Fig. 2 is an enlarged section on the line 2—2, Fig. 1; Fig. 3 is a similar section of the hub of the wheel, showing a modification; Fig. 4 is a section on the line 4—4, Fig. 2; Fig. 5 is a detail perspective view of a wedge or space-block; Fig. 6 is a similar view of a modified form of wedge; and Fig. 7 is a partial outer face view of the hub with the face-plate removed.

Referring to said drawings, in which like designating characters distinguish like parts throughout the several views, 1 indicates the body portion of a metal hub which is recessed rearwardly from its front face to form spaced inwardly tapered recesses 2 separated by radially disposed ribs 3, said recesses terminating at their rear ends to form an annular rear wall 1ª. Spokes 4 composed of flat resilient bow-shaped strips of metal, preferably of high-grade spring steel, are disposed in pairs in oppositely facing relation, the inner ends of the spokes composing a pair being received in adjacent recesses 2 against opposite faces of a rib 3. Each recess serves to receive the adjacent spokes of two adjacent pairs, and the spokes so received by the recess are maintained in close engagement with the opposite ribs by means of a wedge-shaped block 5 which is preferably composed of a substantially U-shaped piece of metal, as shown in Figs. 4 and 5. Said block is provided with a central aperture 6 through which is directed a tap-bolt 7 having its inner end threaded into a socket 8 provided in the hub 1, said bolt being designed to draw said block into wedging relation to the opposite spokes, as shown in Fig. 4. Said blocks 5 perform, first, the function of holding the spokes in spaced relation in the hub; second, the function of forming brace-like bearings over which the spokes are permitted to bend, and, third, the function of preventing dirt, mud and the like from collecting in the recesses.

Provided in the opposite edges of each spoke adjacent to the inner end thereof are recesses or notches 9, substantially semicircular in form, of which the rear-edge notch is adapted to receive therein inwardly extending bead-like projections 10 formed on the inner face of the rear wall 1ª of the hub. The spokes are secured in the hub by means of a face-plate 11 which is screwed upon the outwardly projecting exteriorly threaded sleeve-extension 1ᵇ of the hub into closing relation to the outer ends of the recesses 2 and which has a cap nut 12 threaded up thereagainst to inclose the end of the spindle 13. The ribs 3 have notches 14 formed in their outer edges, said notches corresponding to the notches 9 provided in the outer edges of the spokes and registering with the latter, as shown in Fig. 7. Said face-plate 11 may have a circular bead 15 formed thereon to seat in the registering notches 9 and 14, as shown in Fig. 2, or said plate may have its inner face made plain, in which event a ring 16 fitted in the outer notches 9 of the spokes and the notches 14 of the ribs is thereby caused to seat firmly for holding said spokes in place, as shown in Fig. 3. The bead or ring, as the case may be, serves to lock the spokes in the recesses, preventing chance displacement thereof. The outer ends of the opposing spokes constituting a pair are bolted against the opposite faces of the radially directed stem 17 of a substantially T-shaped lug 18 which is secured, preferably by welding, to the rim 19 of the wheel. As is obvious, the replacement of a broken spoke may be quickly and conveniently accomplished, it being only necessary, in effecting the removal of a spoke, to remove the cap-nut 12, face-plate 11 and the adjacent wedge-block 5, after which the outer end of the spoke is detached from the lug 18.

In Fig. 6 is illustrated a wooden wedge-block 5ª designed to occupy substantially the whole of the unoccupied space in the recess 2 of the hub. Said block is provided with undercut notches 20 at its opposite ends which permit of its passage by the opposite beads 10 and 15. The recesses 2 may be so shaped that the intervening ribs are of inwardly tapered form, as shown at 3ª in Fig. 7.

What is claimed is—

In a vehicle wheel, a hub body provided with spaced recesses separated by radially disposed ribs, said recesses opening outward through the front face of said body, resilient spokes having their inner ends received in said recesses, said spokes being arranged in pairs, the inner ends of the spokes composing a pair being disposed in adjacent recesses against the opposite sides of the intervening rib, bow-shaped wedge-blocks mounted in said recesses between adjacent pairs of spokes, each of said blocks being disposed with its terminals directed inwardly and being adapted to permit bending of the spokes over the curved end thereof, and a face-plate removably mounted in closing relation to the outer ends of said recesses, said face-plate maintaining said spokes locked against withdrawal from said recesses.

In testimony whereof, I affix my signature in presence of two subscribing witnesses.

HARPER E. STRATTON.

Witnesses:
FRANK W. STONE,
E. E. STRATTON.

Copies of this patent may be obtained for five cents each, by addressing the "Commissioner of Patents. Washington, D. C."